(12) United States Patent  
Park et al.

(10) Patent No.: US 8,442,929 B2  
(45) Date of Patent: May 14, 2013

(54) PREDICTING ITEM-ITEM AFFINITIES BASED ON ITEM FEATURES BY REGRESSION

(75) Inventors: Seung-Taek Park, San Jose, CA (US); Wei Chu, Sunnyvale, CA (US); Wei Du, Burbank, CA (US); Uminder Singh, Mountain View, CA (US); Jessi Dong, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 733 days.

(21) Appl. No.: 12/613,503

(22) Filed: Nov. 5, 2009

(65) Prior Publication Data

US 2011/0107260 A1 May 5, 2011

(51) Int. Cl.  
*G06F 17/00* (2006.01)  
*G06N 5/00* (2006.01)

(52) U.S. Cl.  
USPC .............................. 706/45; 715/753; 707/749

(58) Field of Classification Search ...................... 706/45  
See application file for complete search history.

(56) References Cited

U.S. PATENT DOCUMENTS

| | | | |
|---|---|---|---|
| 2002/0010625 A1 | 1/2002 | Smith et al. | |
| 2010/0251305 A1* | 9/2010 | Kimble et al. | 725/46 |
| 2011/0035273 A1* | 2/2011 | Parikh et al. | 705/14.42 |

* cited by examiner

*Primary Examiner* — Kakali Chaki  
*Assistant Examiner* — Kalpana Bharadwaj  
(74) *Attorney, Agent, or Firm* — Hickman Palermo Truong Becker Bingham Wong LLP; Edward A. Becker

(57) ABSTRACT

Two items are determined to be similar to each not only based on previous actual user behavior, but also based on the observed relatedness of the characteristics of those two items. A first characteristic and a second characteristic are determined to have some affinity for each other if a high proportion of users who select items having the first characteristics also select items that have the second characteristic, and vice-versa. Two items having characteristics with high affinity for each other are determined to have some similarity to each other, even if very few or no users who selected one of those items ever selected the other of those items. A first item that is determined to be sufficiently similar to second item in this manner may be recommended to a user who has selected the second item as potentially also being of interest to that user.

20 Claims, 3 Drawing Sheets

PREDICTING ITEM-ITEM AFFINITIES BASED ON ITEM FEATURES BY REGRESSION

FIELD OF THE INVENTION

The present invention relates to techniques for determining which other item(s) to recommend to a user who has manifested interested in a particular item.

BACKGROUND

There are now in existence many different web sites that accept query terms from users and return, to those users, lists of items that match those query terms. For example, a web site might deal with sales of used automobiles. In such a case, each of the items with which the web site deals might be a separate real-world automobile. Each of the items in such a web site might be created by a different selling user who currently owns the used automobile to which that item refers. In creating a particular item in the web site, a particular selling user might provide information about the used automobile that he seeks to sell. The particular selling user might provide information such as the make and model of the automobile, the year in which the automobile was manufactured, the number of miles that the automobile has been driven, and the price at which the particular selling user is offering to sell the automobile. This information is stored at the web site in association with the item.

Other users who are seeking to buy a used automobile may enter query terms into categorized fields in order to find items in which they are especially interested. For example, the used automobile web site discussed above might provide a user interface through which a prospective buying user can submit, as query terms, a make and model, a year, a number of miles, and a price. After receiving the query terms from the prospective buying user, the web site might search a database of items previously created by other users, and return, to the prospective buying user, a list that contains items that have attributes that match the submitted query terms. The prospective buying user can then peruse the list of matching items to determine whether any of the items represent automobiles that the prospective buying user actually wants to purchase. If the prospective buying user locates a particular item in which the prospective buying user is especially interested, then the prospective buying user might use his mouse to click on that particular item within the list of matching items, thereby causing the web site to display further details pertaining to the selected item.

The query terms that the prospective buying user submits might be too narrow in scope in that they might cause the web site to return a list that excludes some items in which the prospective buying user actually might be interested. These excluded items might not be returned within the list simply because their attributes fail to match one or more of the query terms that the prospective buying user submitted. For example, if the prospective buying user submitted a search for "Chrysler Sebring," then the item list that the web site returns to the user likely will not contain any item whose make and model is not "Chrysler Sebring." However, whether the prospective buying user knows it or not at the time of the query formulation, the prospective buying user might also find interesting items whose make and model is "Toyota Solara" (a vehicle which is similar to the Chrysler Sebring but manufactured by a different corporation). If the prospective buying user had seen, in the item list, items whose makes and models included "Toyota Solara," then the user might have selected some of those items instead of or in addition to the "Chrysler Sebring" items that were actually contained in the item list.

However, a more sophisticated version of the used automobile web site discussed above might use some mechanism to attempt to determine, automatically, other items in which the user might be interested, but which did not actually match the user's query. When the user actually selects an item from the item list, the web site might present, along with the details for that selected item, a list of recommended items in which the user also might be interested. These recommended items might not have been contained in the original item list for reasons discussed above. Nevertheless, the user might investigate some of the recommended items further by clicking on them.

The challenge for such a web site is to determine which other items to recommend to a user after the user has selected a particular item from the initial item list. One approach that the web site might employ in determining which other items to recommend to the user involves recommending, to the user, other items that were also selected by other users who also selected the particular item. For example, if a very high proportion of the other users who selected the first item also selected a second item (e.g., by clicking on those items after those items had been presented to those other users in some list), then this may signify to the web site that the kind of user who shows interest in the first item probably will also be interested in the second item. Therefore, the web site might include the second item in a set of recommended items that the web site presents to a user who selected the first item. The web site may do so even if the second item did not match any query terms that the user previously submitted to the web site. Advantageously, under this approach, recommendations are based on actual observed user behavior within a community of users (specifically, the users of the web site).

Unfortunately, although this approach provides a starting point, the used automobile web site discussed in the foregoing example might query a very large database that includes millions of items. With so many items in the database, there exists a significant possibility that most of those items will never have been selected by any user (or selected only a few times, at most). Newer items that have recently been created and added to the web site's database are even more likely to never have been selected by any user. These items are unlikely to be recommended to a user, at least in the short term, if the web site uses the foregoing approach, because these items have not yet been selected. Consequently, even though the web site's database might contain a newly created item in which a prospective buying user might be keenly interested (if he only knew about that item), the prospective buying user will probably not ever see the newly created item, unless that item's attributes happen to match the query terms, if the web site uses the foregoing approach.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A technique described herein automatically determines that two items are similar to each not only based on previous actual user behavior, but also based on the observed relatedness of the characteristics of those two items. A first characteristic and a second characteristic are determined to have some affinity for each other if a high proportion of users who select items having the first characteristics also select items that have the second characteristic, and vice-versa. Two items having characteristics with high affinity for each other are determined to have some similarity to each other, even if very few or no users who selected one of those items ever selected the other of those items. A first item that is determined to be sufficiently similar to second item in this manner may be recommended to a user who has selected the second item (e.g., by using his mouse to click on the second item within a list of items) as potentially also being of interest to that user.

For example, using a technique described herein, an "item listing" web site might automatically determine, based on observed actual user behavior, that users who have manifested interested in 5-year-old Hondas are likely to be interested in 5-year-old Toyotas as well. Having made such a determination, in response to any user selecting any item that is a 5-year-old Honda, the web site may also recommend, to that user, one or more other items that are 5-year-old Toyotas. The web site may recommend these other items to the user even if very few or no other users have ever selected those other items. Put another way, in one embodiment of the invention, recommendations are based on relationships between the characteristics of items rather than solely on relationships between individual items themselves.

Item-Item Similarity Matrix

As is discussed above, a technique described herein determines that two items are similar enough to each other—so that one can be recommended in response to user selection of the other—if the characteristics of those items are known to have sufficiently high affinity for each other. According to one embodiment of the invention, the extent to which such characteristics have affinity for each other is automatically determined based on the actual observed behavior of users in a user community (e.g., such as the user of an "item listing" web site). In one embodiment of the invention, this determination involves the generation of an item-item similarity matrix Y. For each item in the system (each item typically representing some single instance of a concrete real-world object, such as a particular single automobile for sale, rather than a class or type of that object), matrix Y contains a separate row and a separate column. Thus, if there are one million items in a web site's database, then the item-item similarity matrix Y will contain one million columns and one million rows.

The elements of the item-item similarity matrix Y generally reflect the similarity between two specific items (the items to which the element's column and row correspond) based on actual observed user behavior toward those two items. For example, an element of the item-item similarity matrix Y at column i and row j might contain a value that indicates the number of times that a user selected both item i and item j. The value might indicate the number of sessions in which a selection of both item i and item j occurred, or the value might indicate the number of distinct users (i.e., no user counted more than once) who selected both item i and item j at any time. These values are based on actual observed user behavior because they are based on actual historical user selections of items in the web site. As has been discussed above, though, many of these items might never have been selected by any user of the web site. Therefore, the highly sparse item-item matrix Y is a source of information for the determination of the affinity between item characteristics, but the values contained therein are not solely determinative of the similarity of two concrete real-world items. The fact that the value of the element occurring within column i and row j of item-item matrix Y might indicate that no users ever selected both items i and j is not conclusively determinative that items i and j are not similar.

There is a variety of different ways in which the elements of item-item matrix Y might be populated with values. In one embodiment of the invention, the value of element $y_{ij}$ (where i is the column and j is the row of item-item matrix Y) is a conditional probability such that the value of $y_{ij}=P(j|i)$. In this case, $P(j|i)$ may be a probability that is calculated by dividing (a) the number of distinct users who previously selected both items i and j from the web site by (b) the total number of distinct users who previously selected item i from the web site. In another embodiment of the invention, the value of element $y_{ij}$ is the cosine similarity between two vectors $z_i$ and $z_j$. In each of these vectors, there is a separate element for each distinct user of the web site. For example, if there are m distinct users of the web site, then each of vectors $z_i$ and $z_j$ will have m elements. In vector $z_i$, for each index k from 1 to m, the value of the $k^{th}$ element is zero if the $k^{th}$ user did not ever select element i, but the value of the $k^{th}$ element is one if the $k^{th}$ user selected element i at least once. Similarly, in vector $z_j$, for each index k from 1 to m, the value of the $k^{th}$ element is zero if the $k^{th}$ user did not ever select element j, but the value of the $k^{th}$ element is one if the $k^{th}$ user selected element j at least once.

Item-Feature Matrix

An embodiment of the invention uses item-item matrix Y discussed above in conjunction with an item-feature matrix X in order to determine affinities between item characteristics. In one embodiment of the invention, a separate profile vector $x_i$ is generated for each item i in the web site's database. Each such item has a set of features that describe that item, and each of these features belongs to some feature category. For example, if the web site is a used automobile sales web site, then the feature categories might be (a) make and model combination, (b) age range, (c) price range, and (d) mileage range. For each such feature category, some portion of the elements of profile vector $x_i$ is devoted to that feature category. The number of elements that are devoted to a feature category is equal to the number of different features that are in that feature category. For example, if there are 1600 different possible combinations of make and model, then 1600 elements of profile vector $x_i$ will be devoted to the "make and model" feature category. For another example, if there are 11 different defined age ranges (e.g., less than 1 year old, 1 to 2 years old, and so forth, all the up to over 10 years old), then 11 elements of profile vector $x_i$ will be devoted to the "age range" feature category.

In one embodiment of the invention, each profile vector $x_i$ is a binary vector. The value of a particular element in profile vector $x_i$ is set to one if item i possesses that feature, and is set to zero otherwise. An item can possess at most one (and usually exactly one) feature from each feature category. Thus, if there are exactly four feature categories, then each profile vector $x_i$ will contain exactly four ones, and the remainder of the elements of that vector will contain zeroes.

For each item i in the web site database, row i of item-feature matrix X contains profile vector $x_i$. Thus, if there are one million items in the web site database, and if each profile vector $x_i$ contains 1650 binary values, then item-feature matrix X will be a 1650-by-one million matrix. Since the majority of the values in each profile vector $x_i$ are likely to be zeroes, item-feature matrix X is likely to be very sparse.

Feature-Feature Affinity Matrix

With item-item matrix Y and item-feature X defined as discussed above, a feature-feature matrix W can be learned. The following equation is true:

$$Y \approx XWX^T$$

Thus, item-feature matrix X multiplied by feature-feature matrix W multiplied by the transpose item-feature matrix $X^T$ produces item-item matrix Y. In this equation, item-item matrix Y and item-feature matrix X are known. The above equation then may be solved for W.

In feature-feature matrix W, the element w at row a and column b, denoted $w_{ab}$, indicates the extent to which the feature represented by row a has affinity for the feature represented by column b. For example, if row a represents feature "Honda Accord" (a feature belonging to the "make/model" feature category) and if column b represents feature "Chrysler Sebring" (a feature belonging to the "make/model" feature category), then $w_{ab}$, indicates the extent to which the feature "Honda Accord" has affinity for the feature "Chrysler Sebring." Essentially, $w_{ab}$, represents a weight. In the present example, if the value of $w_{ab}$ is large, then this indicates that users who have shown interest in items that have the "Honda Accord" feature are likely to be interested in items that have the "Chrysler Sebring" feature.

Therefore, in one embodiment of the invention, feature-feature matrix W is automatically determined based on item-item matrix Y and item-feature matrix X.

Predicting the Affinity Between Two Items

As is discussed above, item-item matrix Y indicates known affinities between items based on actual observed user behavior. That is, if five out of one hundred users of a web site selected both item i and item j, then, in one embodiment of the invention, $y_{ij}$ will contain a value that reflects that fact; the value of $y_{ij}$ might be 0.05 under such circumstances. However, as is also discussed above, the values of many of the elements of item-item matrix Y are likely to be zero due to the fact that no user has been observed selecting both of the items to which the element's column and row correspond. A value of zero does not actually indicate that those items truly have no affinity for each other; only that such affinity has not yet been measured.

Therefore, in one embodiment of the invention, after the values in feature-feature matrix W have been determined, those values are used in conjunction with the values in item-feature matrix X to predict the affinity between any two items that a user may select. According to one embodiment of the invention, the affinity between two items i and j is denoted as $s_{ij}$, and the equation for determining $s_{ij}$ is:

$$s_{ij} = \sum_{a=1}^{F} \sum_{b=1}^{F} x_{i,a} x_{j,b} w_{ab}$$

In the foregoing equation, the value of F is the total number of features represented within item-feature matrix X (that is, the number of columns in item-feature matrix X if each row of X corresponds to a different item). In the foregoing equation, a and b are indices. In the foregoing equation, $x_i$ is the profile vector at row i of item-feature matrix X, while $x_{i,a}$ is the $a^{th}$ element of profile vector $x_i$. Similarly, in the foregoing equation, $x_j$ is the profile vector at row j of item-feature matrix X, while $x_{j,b}$ is the $b^{th}$ element of profile vector $x_j$. Finally, in the foregoing equation, $w_{ab}$ is the value contained within the element of feature-feature matrix W that occurs at row a and column b. Thus, in one embodiment of the invention, for any two specified items i and j, the predicted affinity between those items, $s_{ij}$, is determined using the foregoing equation and the values within matrices X and W.

The foregoing equation also can be expressed using the following alternative notation:

$$s_{ij} = w^T(x_j \otimes x_i)$$

In the equation expressed using the alternative notation, w is a column vector of elements $\{w_{ab}\}$, and $s_{ij}$ is determined by multiplying w by the tensor product of $x_i$ and $x_j$.

Regression coefficients can be optimized in a regularization framework such that:

$$\operatorname*{argmin}_{w} \sum_{ij} (y_{ij} - s_{ij})^2 + \lambda \|w\|_2^2$$

In the foregoing equation, $\lambda$ represents a tradeoff between empirical error and model complexity. According to one embodiment of the invention, not all i and j are involved in the summation, but only those for which $y_{ij}$ is defined in item-item matrix Y (such that $y_{ij}$ contains some non-null information). The optimal solution of w is unique and has a closed form of matrix manipulation, that is:

$$w^* = \left( \sum_{ij} x_j x_j^T \otimes x_i x_i^T + \lambda I \right)^{-1} \left( \sum_{ij} y_{ij} x_j \otimes x_i \right)$$

In the immediately preceding equation, I is an identity matrix of size $F^2$ by $F^2$. Tensor products are used to determine w.

In one embodiment of the invention, after feature-feature matrix W has been learned based on the equation $Y=XWX^T$, the affinity between items i and j is determined using the following equation:

$$s_{ij}=x_i W x_j^T$$

In the foregoing equation, $s_{ij}$ is the predicted affinity between item i and item j. In the foregoing equation, $x_i$ is the profile vector for item i in item-feature matrix X (occurring at row i within that matrix). W is the learned feature-feature matrix discussed above. Finally, $x_i^T$ is the profile vector for item j (occurring at row j within item-feature matrix X) transposed.

Example Flow

In one embodiment of the invention, for every pair of items within a database of a web site (such as the used automobile website discussed in the previous examples), the predicted affinity between those items is determined using the techniques discussed above. For each pair of items, the predicted affinity between those items is stored for later retrieval and use. Whenever further user behavior is observed in the web site, such as user selection of a particular item, item-item matrix Y may be updated, and the predicted affinities between that item and other items may be recalculated based on the new values in item-item matrix Y. Similarly, whenever a new item is added to the web site's database, the matrices discussed above may be augmented, and the predicted affinities may be recalculated based on the new values in the augmented matrices.

In one embodiment of the invention, in response to a user selecting a particular item from a list of items that the web site has presented to that user, the web site ranks all of the other items in descending order of their affinities for the selected item. The web site then takes the other items that are in the top N (where N is some specified value) of the affinity-ranked item list, and presents those other items to the user as recommendations. For example, if the user clicks on a particular item in a list of items, then the web site might present, to the user, a web page that contains details about the particular item on which the user clicked. That web page may include a list of five other recommended items, those other recommended items being the five items that had the highest predicted affinity $s_{ij}$ for the particular item. For example, the list of other recommended items may be a list of hyperlinks to web pages that provide details about each of those items, such that the user may select any one of those recommended items in order to obtain additional details about the selected recommended item from the web site.

Figure 1:
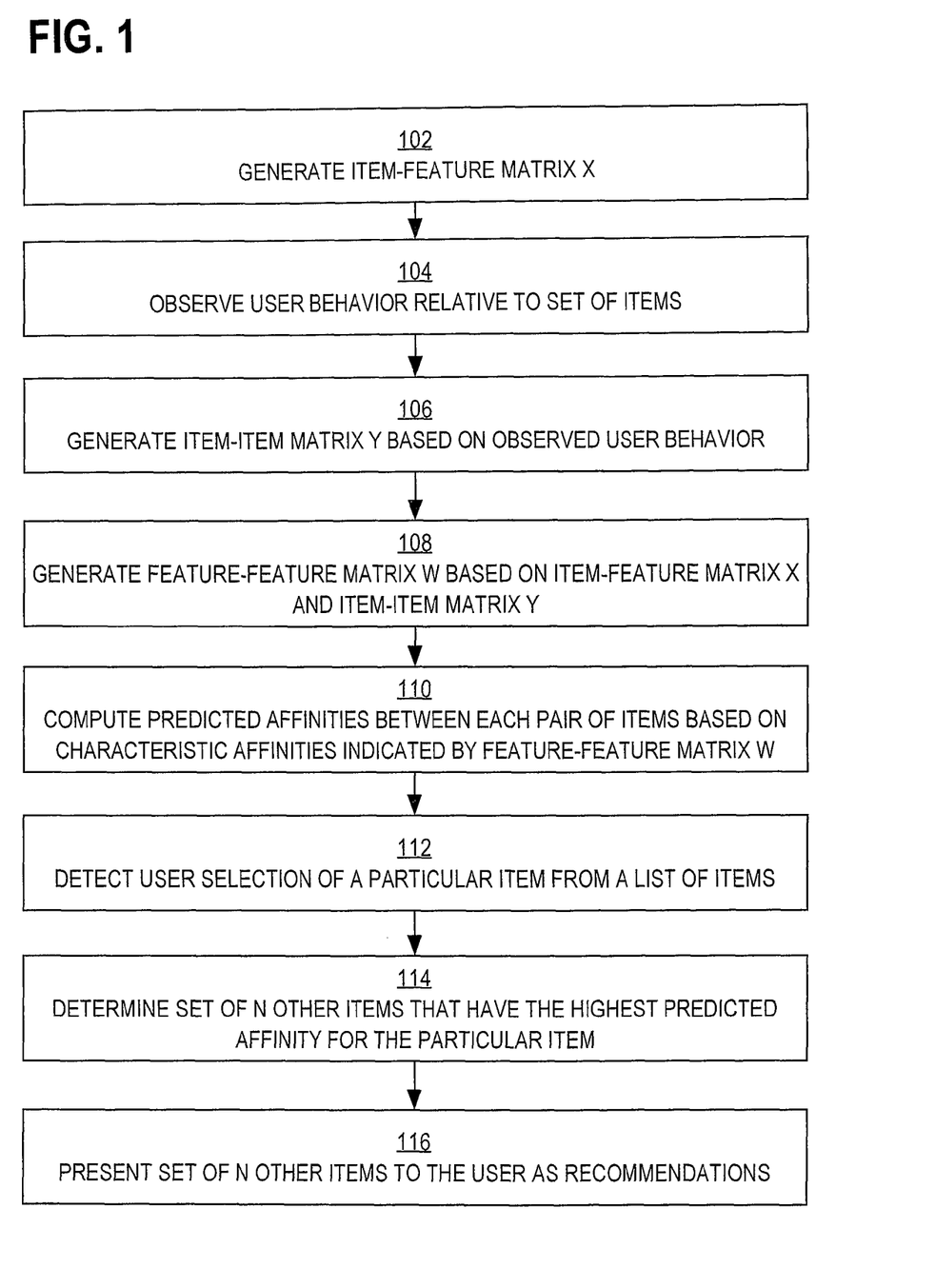
FIG. 1 is a flow diagram that illustrates an example of a technique that may be used to present a set of recommended items to a user after that user has manifested interest in a particular item.

FIG. 1 is a flow diagram that illustrates an example of a technique that may be used to present a set of recommended items to a user after that user has manifested interest in a particular item, according to an embodiment of the invention. In block 102, an item-feature matrix X is generated. For example, item-feature matrix X may be updated every time that a new item is submitted to a web site. A new row for the new item may be added to item-feature matrix X, and that row may contain the profile vector for the item, thereby indicating, for each feature category (e.g,. "make/model," "age range," "price range," "mileage range," etc.), which of the features the item possesses. As is discussed above, the item's profile vector may be a binary vector that contains a separate non-null value for each feature category.

In block 104, user behavior relative to a set of items is observed. For example, the web site may monitor, for each user of the web site, which items that user selected, and/or which items were selected within the same session. According ton one embodiment of the invention, based on the set of items that were selected (either within the same session or by the same user over potentially several sessions), a set of all pairs of combinations of those selected items is determined. For example, if items A, B, and C were selected, then the determined pairs would be (A, B), (A, C), and (B, C).

In block 106, an item-item matrix Y is generated based on the observed user behavior. For example, in response to determining that a user selected both item i and item j, or that items i and j were both selected in the same session, the web site may increment the value that is contained within the element that occurs at column i and row j of item-item matrix Y.

In block 108, a feature-feature matrix W is generated and populated based on the known item-feature matrix X and the known item-item matrix Y. In one embodiment of the invention, the feature-feature matrix is generated using the equation $Y=XWX^T$ and solving for W.

In block 110, for each pair of items in the web site's database, a separate predicted affinity between the items in that pair is computed and stored. The predicted affinity between the items in an item pair is determined based on the affinities between those item's features or characteristics, as indicated by the values in feature-feature matrix W. In one embodiment of the invention, the predicted affinity between a pair of items i and j is computed using the formula $$s_{ij} = \sum_{a=1}^{F}\sum_{b=1}^{F} x_{i,a} x_{j,b} w_{ab} \text{ or } s_{ij} = w^T(x_j \otimes x_i) \text{ or } s_{ij} = x_i W x_j^T.$$

In one embodiment of the invention, tensor regression is used to determine the predicted affinity.

In block 112, user selection of a particular item in a list of items is detected. For example, after having received a query from the user, and having presented, to the user, a list of items that satisfy or match the query, the web site may detect that the user has selected the particular item by clicking on that particular item's hyperlink in the list.

In block 114, in response to detecting that the particular item has been selected, a set of N other items that have the highest predicted affinities for the selected item are determined. For example, the web site may determine the top ten other items that have the highest predicted affinity for the particular item of all of the items in the web site's database.

In block 116, the set of N other items that have the highest predicted affinity for the particular item is presented to the user. For example, the web site may show the list of other items to the user and inform the user that, because the user has expressed interested in the particular item by clicking on the particular item, the user would probably also be interested in the other items in the list (some or all of which might not have satisfied the user's initial query terms). Thus, the web site recommends, to the user, other items that have high predicted affinity for the particular item that the user selected.

In one embodiment of the invention, both the item-based closed-form algorithm discussed above, as well as a multi-affinity algorithm, which utilizes observed item-item similarity, is used for personalized recommendations. For example, if matrix Y indicates that two items i and j have a high observed (rather than predicted) affinity for each other, potentially indicated by a significantly large value occurring at column i and row j of matrix Y, then the fact that this value is greater than a specified threshold may be used to justify inclusion of item j within a recommended item list presented in connection with item i, and/or to justify inclusion of item i within a recommended item list presented in connection with item j. Thus, in one embodiment of the invention, items may be selected for inclusion within a personalized recommended items list based either on observed affinity or predicted affinity (determined using techniques described herein) for another item in which a user has manifested interest.

Example Items

There is virtually no limit on the kinds of items for which various embodiments of the invention can automatically find affinities. For example, in one embodiment, affinities are found between items that users have listed for sale on a web site. In another embodiment, affinities are found between Internet-accessible documents that an Internet search engine returns. In another embodiment, affinities are found between images in an image repository, such that when a user selects a particular image from a set of images (such as a set of images that matched user-submitted query terms), the automated system presents, to the user, a set of recommended images that were determined to have affinity for the particular image. Affinities similarly may be found for video clips, and video clips may be recommended to a user who selected a video clip from a list of video clips.

The recommended items do not necessarily need to be of the same type as the item that the user selected. For example, in one embodiment of the invention, affinities are found between listed items in a web site and pages on other web sites. In such an embodiment of the invention, an automatic determination is made that certain listed items have characteristics that have affinity for the characteristics of pages of other web sites. Thus, when a particular item is selected, pages that have characteristics that have affinity for the particular item's characteristics may be recommended to the user.

For another example, in one embodiment of the invention, affinities are found between listed items in a web site and movies that are currently playing in movies theaters or which are available for rental. In such an embodiment of the invention, an automatic determination is made that certain listed items have characteristics that have affinity for the characteristics of certain movies. Thus, when a particular item is selected, movies that have characteristics that have affinity for the particular item's characteristics may be recommended to the user.

For another example, in one embodiment of the invention, affinities are found between listed items in a web site and salable products. In such an embodiment of the invention, an automatic determination is made that certain listed items have characteristics that have affinity for the characteristics of certain salable products. Thus, when a particular item is selected, advertisements that advertise the products that have characteristics that have affinity for the particular item's characteristics may be shown to the user in response to that user selecting the particular item from a list of items.

For another example, in one embodiment of the invention, the items are "personals" listings submitted by people who are seeking relationships with other people. Affinities are found between the features and attributes of various personals listings (e.g., height, weight, age, marital history, smoking or not, drinking or not, pet lover or not, athleticism, religion, political bent, etc.). Thus, when a particular personals listing is selected, a "matchmaking" website may recommend other personals listings that have characteristics that have affinity for the particular personals listing's characteristics.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
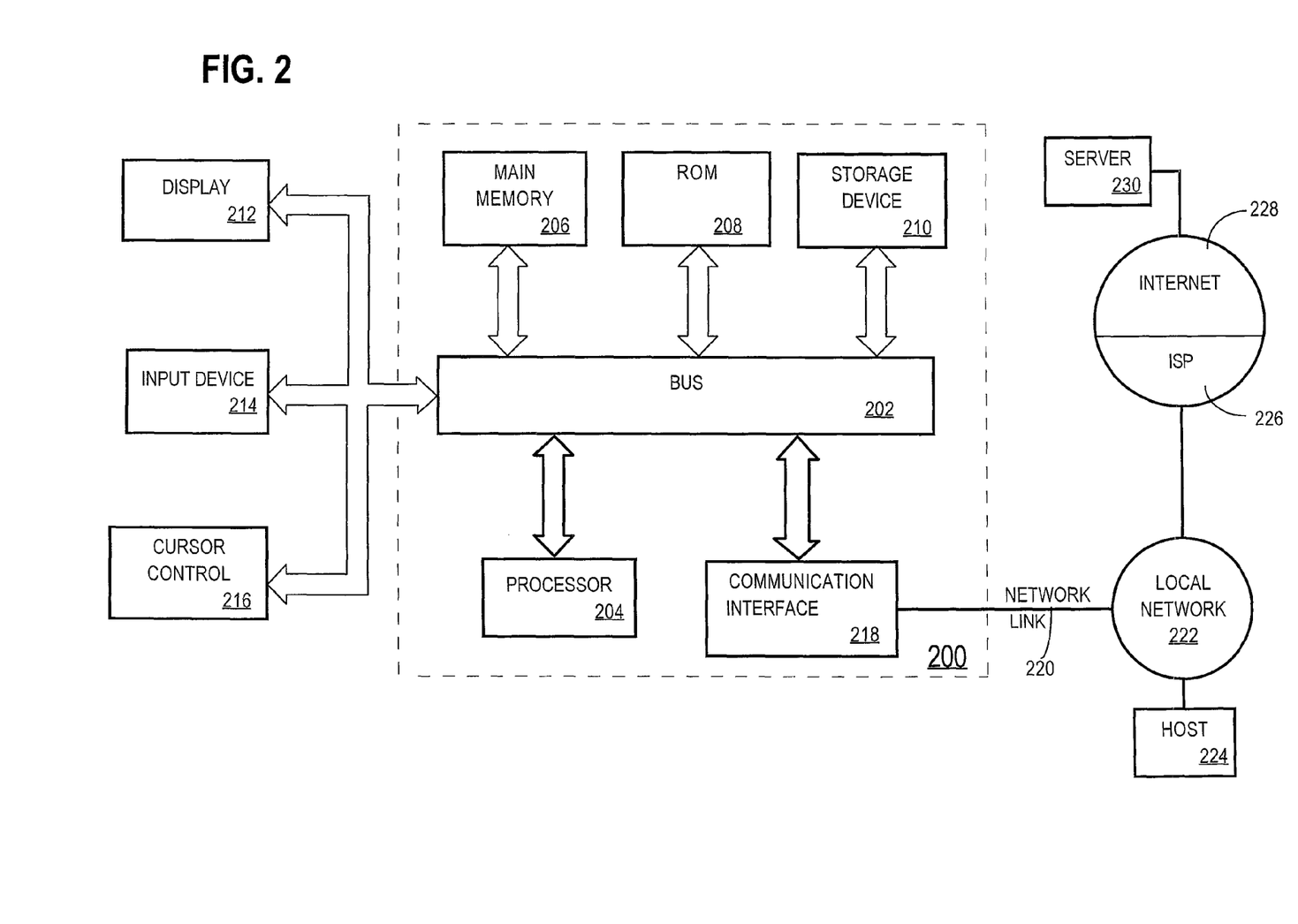
FIG. 2 is a block diagram that illustrates a computer system upon which an embodiment of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

Example Client-Server Architecture

Figure 3:
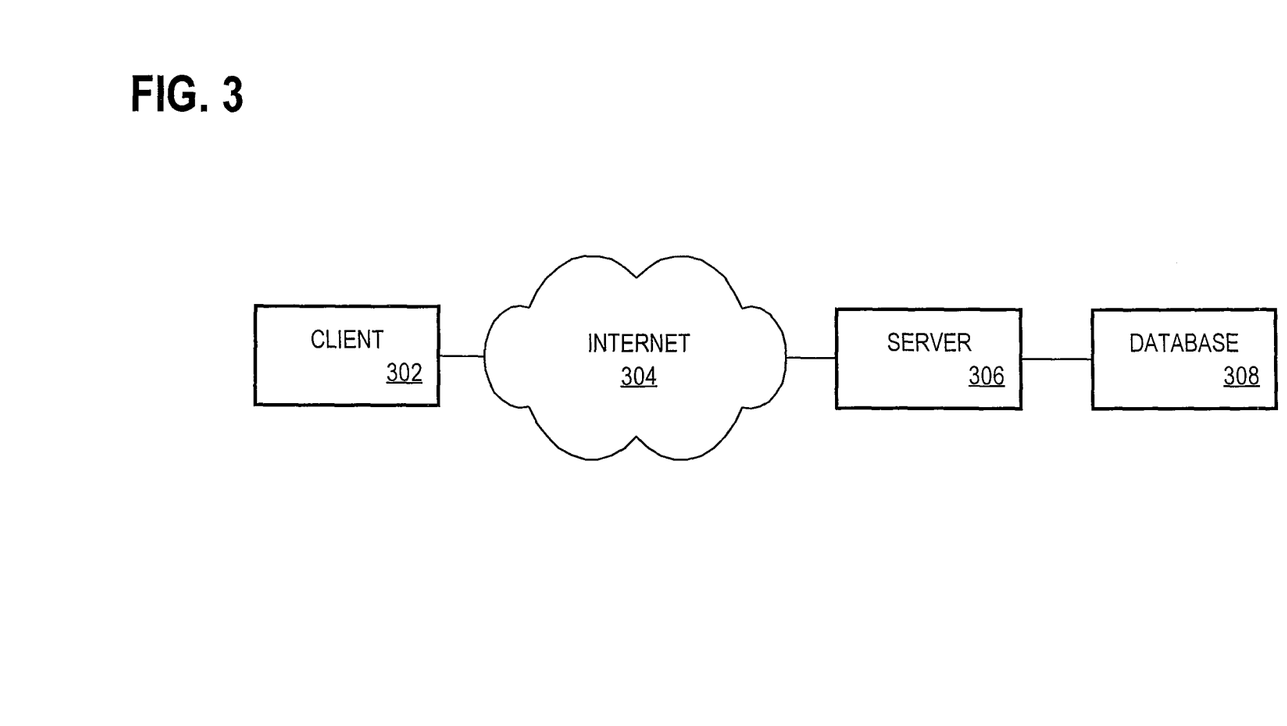
FIG. 3 is a block diagram that illustrates a client-server architecture in which an embodiment of the invention may be practiced.

Certain embodiments of the invention may be practiced within a client-server architecture. FIG. 3 is a block diagram that illustrates a client-server architecture in which an embodiment of the invention may be practiced. Client 302 sends requests over Internet 304 to server 306. Server 306 receives those requests and processes those requests by retrieving information from and/or storing information in database 308. Based on data within database 308, server 306 generates a response to the request that server 306 received from client 302. Server 306 sends this request over Internet 304 to client 302.

In one embodiment of the invention, the requests and responses discussed above are formed in a markup language such as Hypertext Markup Language (HTML) or Extensible Markup Language (XML). In one embodiment of the invention, the requests and responses discussed above are carried over Internet 304 using the Hypertext Transfer Protocol (HTTP). HTTP requests and responses may themselves be carried over Internet 304 within packets that are formed in conformity to Transfer Control Protocol (TCP) or User Datagram Protocol (UDP). Such packets may be encapsulated within Internet Protocol (IP) packets and transmitted based on Ethernet protocol. In one embodiment of the invention, client 302 is or executes an Internet browser application such as Mozilla Firefox, and server 306 is or executes an Internet web server application.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   determining a proportion of users who select both (a) items that have a first characteristic and (b) items that have a second characteristic;
   determining whether the proportion is greater than a specified threshold;

in response to determining that the proportion is greater than the specified threshold, storing data that indicates an affinity between the first characteristic and the second characteristic;

detecting a particular user's selection, from a list of items, of a particular item that possesses the first characteristic;

determining, based at least on the data that indicates the affinity between the first characteristic and the second characteristic, a set of other items that possess the second characteristic; and presenting one or more items from the set of other items to the user as recommended items;

wherein the steps are performed by one or more computing devices.

2. The computer-implemented method of claim 1, wherein no items in the set of other items possess the first characteristic.

3. The computer-implemented method of claim 1, further comprising:

receiving one or more query terms from the particular user;

determining a set of items that possess characteristics that match the one or more query terms;

generating the list of items by placing items from said set within the list of items; and presenting the list of items to said particular user;

wherein the set of items does not contain any items that possess the first characteristic.

4. A computer-implemented method comprising:

generating an item-item matrix based on observed user behavior;

generating an item-feature matrix that indicates, for each item in a set of items, a set of features that the item possesses;

automatically determining a feature-feature matrix based both the item-item matrix and the item-feature matrix;

predicting an extent of affinity between a first item and a second item based on the feature-feature matrix; and based on the extent of affinity between the first item and the second item, presenting the second item as a recommended item to a particular user who manifested interested in the first item;

wherein the steps are performed by one or more computing devices.

5. The computer-implemented method of claim 4, wherein generating the item-item matrix comprises:

detecting that a particular user selected both a third item and a fourth item; and in response to detecting that the particular user selected both the third item and the fourth item, updating, within the item-item matrix, a value of an element that occurs at a column for the third item and a row for the fourth item.

6. The computer-implemented method of claim 4, wherein generating the item-item matrix comprises:

detecting that both a third item and a fourth item were selected within a same session with a particular web site; and in response to detecting that both the third item and the fourth item were selected within a same session with a particular web site, updating, within the item-item matrix, a value of an element that occurs at a column for the third item and a row for the fourth item.

7. The computer-implemented method of claim 4, wherein generating the item-feature matrix comprises:

determining, for each feature category of a plurality of feature categories, a particular feature that a particular item possesses in that feature category;

creating a profile vector for the particular item by (a) setting to null a value of each element of the profile vector that corresponds to a feature that the particular item does not possess and (b) setting to non-null a value of each element of the profile vector that corresponds to a feature that the particular item possesses;

wherein, for each feature category of the plurality of feature categories, the profile vector for the particular item includes only one non-null value; and populating a row of the item-feature matrix that corresponds to the particular item with values from all of the elements of the profile vector for the particular item.

8. The computer-implemented method of claim 4, wherein automatically determining the feature-feature matrix comprises:

determining values within the feature-feature matrix based on an equation $$w^* = \left(\sum_{ij} x_j x_j^T \otimes x_i x_i^T + \lambda I\right)^{-1} \left(\sum_{ij} y_{ij} x_j \otimes x_i\right),$$

wherein $x_i$ is profile vector occurring at a row i of the item-feature matrix, $x_i^T$ is a transpose of $x_i$, $x_j$ is profile vector occurring at a row j of the item-feature matrix, $x_j^T$ is a transpose of $x_j$, $y_{ij}$ is a value occurring at a column i and a row j of the item-item matrix, I is an identity matrix, and $\otimes$ is an operator that indicates that a tensor product of operands left and right of that operator is to be produced.

9. The computer-implemented method of claim 4, wherein predicting the extent of affinity between the first item and the second item comprises:

multiplying (a) a first value in an element of the item-feature matrix that corresponds to a first feature of the first item by (b) a second value in an element of the item-feature matrix that corresponds to a second feature of the second item by (c) a third value that occurs within an element of the feature-feature matrix that corresponds to both the first feature and the second feature, thereby producing a particular product based on a particular formula; and summing the particular product with a plurality of other products that are also computed based on the particular formula but relative to features of the first item and the second item other than the first feature and the second feature, thereby obtaining a summation;

wherein the summation represents the extent of affinity between the first item and the second item.

10. The computer-implemented method of claim 4, wherein predicting the extent of affinity between the first item and the second item comprises:

determining a tensor product of a first vector and a second vector;

multiplying the tensor product with a transpose of a third vector, thereby producing the extent of affinity between the first item and the second item;

wherein the first vector is a profile vector that occurs in the item-feature matrix at a row that corresponds to the first item;

wherein the second vector is a profile vector that occurs in the item-feature matrix at a row that corresponds to the second item; and wherein the third vector is a vector from the feature-feature matrix.

11. A non-transitory computer-readable medium storing instructions which, when processed by one or more processors, cause:
- determining a proportion of users who select both (a) items that have a first characteristic and (b) items that have a second characteristic;
- determining whether the proportion is greater than a specified threshold;
- in response to determining that the proportion is greater than the specified threshold, storing data that indicates an affinity between the first characteristic and the second characteristic;
- detecting a particular user's selection, from a list of items, of a particular item that possesses the first characteristic;
- determining, based at least on the data that indicates the affinity between the first characteristic and the second characteristic, a set of other items that possess the second characteristic; and
- presenting one or more items from the set of other items to the user as recommended items;
- wherein the steps are performed by one or more computing devices.

12. The non-transitory computer-readable medium of claim 11, wherein no items in the set of other items possess the first characteristic.

13. The non-transitory computer-readable medium of claim 11, further comprising additional instructions which, when processed by the one or more processors, cause:
- receiving one or more query terms from the particular user;
- determining a set of items that possess characteristics that match the one or more query terms;
- generating the list of items by placing items from said set within the list of items; and
- presenting the list of items to said particular user;
- wherein the set of items does not contain any items that possess the first characteristic.

14. A non-transitory computer-readable medium storing instructions which, when processed by one or more processors, cause:
- generating an item-item matrix based on observed user behavior;
- generating an item-feature matrix that indicates, for each item in a set of items, a set of features that the item possesses;
- automatically determining a feature-feature matrix based both the item-item matrix and the item-feature matrix;
- predicting an extent of affinity between a first item and a second item based on the feature-feature matrix; and
- based on the extent of affinity between the first item and the second item, presenting the second item as a recommended item to a particular user who manifested interested in the first item;
- wherein the steps are performed by one or more computing devices.

15. The non-transitory computer-readable medium of claim 14, wherein generating the item-item matrix comprises:
- detecting that a particular user selected both a third item and a fourth item; and
- in response to detecting that the particular user selected both the third item and the fourth item, updating, within the item-item matrix, a value of an element that occurs at a column for the third item and a row for the fourth item.

16. The non-transitory computer-readable medium of claim 14, wherein generating the item-item matrix comprises:
- detecting that both a third item and a fourth item were selected within a same session with a particular web site; and
- in response to detecting that both the third item and the fourth item were selected within a same session with a particular web site, updating, within the item-item matrix, a value of an element that occurs at a column for the third item and a row for the fourth item.

17. The non-transitory computer-readable medium of claim 14, wherein generating the item-feature matrix comprises:
- determining, for each feature category of a plurality of feature categories, a particular feature that a particular item possesses in that feature category;
- creating a profile vector for the particular item by (a) setting to null a value of each element of the profile vector that corresponds to a feature that the particular item does not possess and (b) setting to non-null a value of each element of the profile vector that corresponds to a feature that the particular item possesses;
- wherein, for each feature category of the plurality of feature categories, the profile vector for the particular item includes only one non-null value; and
- populating a row of the item-feature matrix that corresponds to the particular item with values from all of the elements of the profile vector for the particular item.

18. The non-transitory computer-readable medium of claim 14, wherein automatically determining the feature-feature matrix comprises:
- determining values within the feature-feature matrix based on an equation $$w^* = \left(\sum_{ij} x_j x_j^T \otimes x_i x_i^T + \lambda I\right)^{-1} \left(\sum_{ij} y_{ij} x_j \otimes x_i\right),$$

wherein $x_i$ is profile vector occurring at a row i of the item-feature matrix, $x_i^T$ is a transpose of $x_i$, $x_j$ is profile vector occurring at a row j of the item-feature matrix, $x_j^T$ is a transpose of $x_j$, $y_{ij}$ is a value occurring at a column i and a row j of the item-item matrix, I is an identity matrix, and $\otimes$ is an operator that indicates that a tensor product of operands left and right of that operator is to be produced.

19. The non-transitory computer-readable medium of claim 14, wherein predicting the extent of affinity between the first item and the second item comprises:
- multiplying (a) a first value in an element of the item-feature matrix that corresponds to a first feature of the first item by (b) a second value in an element of the item-feature matrix that corresponds to a second feature of the second item by (c) a third value that occurs within an element of the feature-feature matrix that corresponds to both the first feature and the second feature, thereby producing a particular product based on a particular formula; and
- summing the particular product with a plurality of other products that are also computed based on the particular formula but relative to features of the first item and the second item other than the first feature and the second feature, thereby obtaining a summation;
- wherein the summation represents the extent of affinity between the first item and the second item.

20. The non-transitory computer-readable medium of claim 14, wherein predicting the extent of affinity between the first item and the second item comprises:
- determining a tensor product of a first vector and a second vector;
- multiplying the tensor product with a transpose of a third vector, thereby producing the extent of affinity between the first item and the second item;
- wherein the first vector is a profile vector that occurs in the item-feature matrix at a row that corresponds to the first item;
- wherein the second vector is a profile vector that occurs in the item-feature matrix at a row that corresponds to the second item; and
- wherein the third vector is a vector from the feature-feature matrix.

* * * * *